(12) United States Patent  (10) Patent No.: US 6,282,917 B1
Mongan  (45) Date of Patent: Sep. 4, 2001

(54) HEAT EXCHANGE METHOD AND APPARATUS

(76) Inventor: Stephen Mongan, Newdale House, Hull Road, Hemingbrough, North Yorkshire, YO8 6QG (GB)

( * ) Notice: Subject to any disclaimer, the term of this patent is extended or adjusted under 35 U.S.C. 154(b) by 0 days.

(21) Appl. No.: 09/354,537

(22) Filed: Jul. 15, 1999

Related U.S. Application Data

(60) Provisional application No. 60/093,140, filed on Jul. 16, 1998.

(51) Int. Cl.[7] .................................................... F25B 15/00
(52) U.S. Cl. .................................. 62/476; 62/106; 62/481
(58) Field of Search ............................... 62/476, 106, 481

(56) References Cited

U.S. PATENT DOCUMENTS

| | | | |
|---|---|---|---|
| 3,828,566 | * | 8/1974 | Wetzel .................................... 62/143 |
| 4,924,676 | * | 5/1990 | Maier-Laxhuber et al. ............. 62/59 |
| 4,956,977 | * | 9/1990 | Maier-Laxhuber et al. ............ 62/106 |
| 5,332,546 | * | 7/1994 | Le Goff et al. ....................... 420/526 |
| 5,456,086 | * | 10/1995 | Hanna ..................................... 62/101 |
| 5,782,097 | * | 7/1998 | Phillips et al. .......................... 62/101 |
| 5,899,092 | * | 5/1999 | Le Goff et al. .......................... 62/476 |
| 5,916,258 | * | 6/1999 | Cho ........................................ 62/476 |

* cited by examiner

Primary Examiner—William Doerrler
Assistant Examiner—Mark Shulman
(74) Attorney, Agent, or Firm—Thomas, Moser & Patterson, LLP; Kin-Wah Tong

(57) ABSTRACT

A heat exchanging method and apparatus for improving heat transfer in a cooling system. Specifically, the heat exchanging method and apparatus is an absorption chiller that comprises a heat transfer device having one heat pipe partially disposed within a second heat pipe, where the juncture of the coupled heat pipes promotes absorption of a vapor into a working solution. The juncture of the coupled heat pipes is disposed within a condenser section such that two processes, condensation and absorption of the absorption chiller are efficiently implemented within a single section or chamber.

20 Claims, 3 Drawing Sheets

HEAT EXCHANGE METHOD AND APPARATUS

CLAIM OF PRIORITY

This application claims the benefit of U.S. Provisional Application No. 60/093,140, filed Jul. 16, 1998, which is herein incorporated by reference.

BACKGROUND OF THE DISCLOSURE

1. Field of Invention

The present invention relates generally to a heat exchange apparatus. More specifically, the invention relates to an apparatus for propelling a process within an "absorption chiller" for providing cooled water to a cooling system, e.g., a central air conditioning system. A heat source, e.g., heated water, is used to release a refrigerant from a lithium bromide solution where the condensed refrigerant is used to cool water for a central air conditioning system. Specifically, the present invention comprises a two-pipe configuration where a first pipe is partially disposed within a second pipe, wherein the coupled portions of the two pipes promote efficient heat exchange, thereby improving the efficiency of the absorption chiller.

2. Description of the Background Art

Currently, it is estimated that space heating, water heating and industrial process heating account for approximately 40% of all energy consumption in the industrialized nations. Furthermore, over 70% of this energy is currently provided by a limited supply of hydrocarbon fuels. In order to conserve and maximize the benefits of our limited resources, it is desirable to increase the thermal efficiency of these processes.

Traditionally, many of the processes and techniques for accomplishing these three functions generate an enormous amount of waste fluids and gases. These byproducts are often simply discharged into the environment without treatment. Generally, these waste products retain a large quantity of energy in the form of heat which, upon release, contributes to the problem of global warming. The waste heat is also indicative of the thermal inefficiency of these processes and the lack of a heat recovery mechanism.

To illustrate, there are many commercial and residential demands for heated water. Such demands include providing heated water to lavatories, laundry facilities and central heating systems. After the heated water is used for washing and bathing, the waste water is simply discharged into the drain. The waste water often retains a significant amount of recyclable heat that is simply released into the environment. The discharge of heated waste water represents the thermal inefficiency of these processes.

The U.S. Pat. No. 5,730,356 issued to Stephen Mongan, herein incorporated by reference, describes a system (the Mongan system) through which one can recover a large portion of the discarded waste energy described above. The Mongan system describes the use of a commercially available absorption chiller that can be adapted for the recovery of waste water heat energy to provide cooling fluids for air conditioning. The above described absorption chiller utilizes a lithium bromide solution as a refrigerant in a four chamber configuration.

The incorporation of such an absorption chiller has enabled the Mongan system to reduce a facility's energy requirements substantially. Correspondingly, increasing the efficiency of the components used to achieve the energy savings enjoyed by employing the Mongan system, will yield a further reduction in energy consumption by the facility. Such reduction in energy consumption beneficially produces energy savings and contributes to the conservation of global energy resources.

Therefore, a need exists in the art for an improved absorption chiller that can provide greater efficiency, thereby reducing the amount of waste heat discharged into the environment.

SUMMARY OF INVENTION

One embodiment of the present invention is a heat exchanging method and apparatus for improving heat transfer in a cooling system. Specifically, the heat exchanging method and apparatus is an absorption chiller having a generator section, a condenser section and an evaporator section. Disposed within these three sections is a heat transfer device having a first heat pipe partially disposed within a second heat pipe, where the juncture of the coupled heat pipes promotes absorption of a vapor into a working solution. More specifically, the juncture of the coupled heat pipes is disposed within the condenser section such that two processes, condensation and absorption of the absorption chiller are efficiently implemented within a single section or chamber, i.e., elimination of the need for a separate absorber section as in prior art absorption chillers. The ability to implement the absorber function using the heat pipes within the condenser provides advantages that, include but are not limited to, a reduction in the size of the absorption chiller and an increase in the overall thermal efficiency, where the cooled water of the condenser is also exploited to absorb the heat generated from the recombination process.

BRIEF DESCRIPTION OF DRAWINGS

The teachings of the present invention can be readily understood by considering the following detailed description in conjunction with the accompanying drawings, in which.

To facilitate understanding, identical reference numerals have been used, where possible, to designate identical element that are common to the figures.

DETAIL DESCRIPTION OF INVENTION

Figure 1:
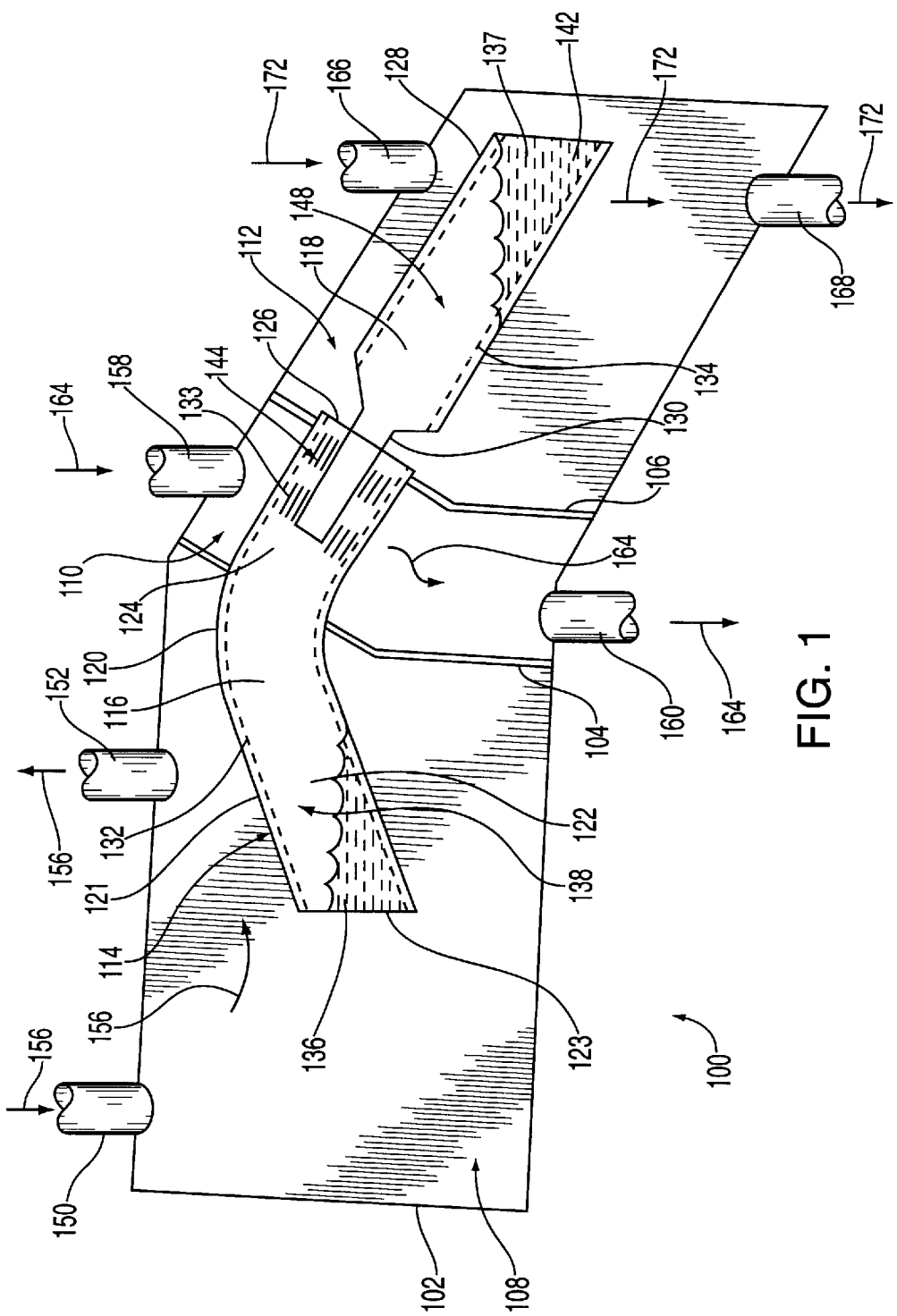
FIG. 1 is a schematic of a heat exchanger of the present invention.

In a preferred embodiment, a heat exchanger, or absorption chiller 100 of the present invention is depicted in FIG. 1. The absorption chiller 100 has a housing 102 fabricated from any structurally stable material, preferably metal or plastic. The absorption chiller 100 has a first bulkhead 104 and a second bulkhead 106 that segment the absorption chiller 100 sequentially into a generator 108, a condenser 110 and an evaporator 112. The generator 108, condenser 110 and evaporator 112 are all sealed from one another.

Disposed within the three chambers or sections of the absorption chiller 100 is a heat transfer device or means 114 that comprises a pair of interlocking "heat pipes" carrying working fluids. In brief, the purpose of the pair of interlocking heat pipes is to effect heat transfer between the various chambers of the absorption chiller 100 and the working fluids of the heat pipes. As a result of a plurality of heat transfer cycles between the heat pipes and the various chambers of the adsorption chiller as described in depth below, chilled water is generated in the evaporator 112 for use in a cooling system. A description of the fluid dynamics within the heat transfer device or means 114 will be described below.

The generator 108 has an inlet 150 and an outlet 152 through which a first heat transfer fluid or source 156 passes as depicted by the fluid flow arrows. The first heat transfer fluid 156 is typically, but is not limited to water. Namely, the generator receives heated water or steam from a heat source, e.g., a heat recovery module through a flow pipe to heat a working fluid, e.g., a dilute solution of lithium bromide and water within one of the heat pipes of the heat transfer means 114. The heating releases the refrigerant from the lithium bromide solution within the heat pipe. Namely, the refrigerant is released from the working fluid and accumulates on one end of the heat pipe that is disposed within the condenser 110.

The condenser 110 similarly has an inlet 158 and an outlet 160 through which a second heat transfer fluid or source 164 passes as depicted by the fluid flow arrows. The second heat transfer fluid 164 is typically cooling water, although air (or other types of fluids) may be used as only a small temperature change (e.g., a change of 4 degrees Celsius) is required when using the invention as described below in a preferred embodiment. The purpose of the condenser is to cause the refrigerant in one end of the heat pipe to condense.

The evaporator 112 also has an inlet 166 and an outlet 168 through which a third heat transfer fluid or source 172 passes as depicted by the fluid flow arrows. The third heat transfer fluid 172 is typically cooling water or "chilled water" for a cooling system, although air (or other types of fluids) may be used. The purpose of the evaporator 112 is to allow the working fluid within one end of the heat pipe to absorb the heat from the cooling system water, thereby causing the working fluid in the heat pipe to vaporize. The cooled third heat transfer fluid 172 is channeled from the evaporator to a cooling system. However, in keeping with a preferred use of the invention, the use of air conditioning cooling fluids as the third heat transfer fluid 172 will contribute substantially to increasing the efficiency of systems such as described by Mongan in U.S. Pat. No. 5,730,356.

Unlike the absorption chiller as disclosed in the Mongan patent, the present absorber section 144 is located within the condenser 110, thereby reducing the need of a separate section or chamber within the absorption chiller. The purpose of the absorber 144 is to effect the recombination of the solution of lithium bromide with the refrigerant within the heat pipe. The ability to deploy the absorber 144 within the condenser 110 provides advantages that include but are not limited to, a reduction in the size of the absorption chiller and an increase in the overall thermal efficiency, where the cooled water of the condenser 110 is also exploited to absorb the heat generated from the recombination process. A detailed description as to the operation of the heat pipes as deployed within the absorption chiller is provided below.

The heat transfer means 114 is disposed within the absorption chiller 100, passing through the first and second bulkheads 104 and 106. The heat transfer means 114 is comprised of a first heat pipe 116 and a second heat pipe 118. The first heat pipe 116 has a substantially uniform diameter 121 of suitably about 22 mm and a bend 120 that separates a first section 122 from a second section 124. The first section 122 terminates in a first end 123. The second section 124 terminates in a second end 126. The second section 124 passes through the first and second bulkheads 104 and 106, securing the heat transfer means 114 within the chiller 100 in an orientation having the first end 123 at a slightly lower elevation than the second end 126. The first heat pipe 116 is partially filled with a first working fluid 136, with the remaining volume substantially occupied by a first vapor 138 that is nearly devoid of air.

The second heat pipe 118 has a first section 128 having a first diameter suitably about 22 mm. and a second section 130 having a reduced diameter suitably about 12 mm. The reduced diameter section 130 of the second heat pipe 118 passes through the second end 126 of the first heat pipe, effectively joining the first heat pipe 116 and second heat pipe 118 into an interlocking configuration. The second heat pipe 118 is partially filled with a second working fluid 137, with the remaining volume substantially occupied by a second vapor 148 that is nearly devoid of air. The portion of the second heat pipe 118 having the reduced diameter 130 effectively forms a portion of the absorber 144 as discussed above. The first heat pipe 116 and the second heat pipe 118 have relatively uniform pressures (i.e., slight pressure deltas exist between the condenser 110 and absorber 144 during operation as further detailed below) within the first pipe 116. It should be noted that the two heat pipes are sealed such that the two working fluids 136 and 137 are not in flow communication.

A first mesh 132 is disposed inside the first heat pipe 116 proximate to the diameter 121, i.e., along the inner wall of the heat pipe. The first mesh 132 forms a plurality of mesh layers 133 by winding the first mesh 132, preferably three or more times, within the second section 124 of the first heat pipe 116. As shown in FIG. 1, when the two heat pipes are interlocked, mesh layer 133 surrounds the reduced diameter section 130 of the second heat pipe. The application of the mesh layer 133 around the reduced diameter section 130 allows that portion of the second heat pipe to function as a portion of the absorber 144.

A second mesh 134 is disposed within the second heat pipe 118 proximate to the first diameter 128. Both the first and second mesh 132 and 134 have pore characteristics that facilitate vapor permeation while inducing capillary action when wetted by the first working fluid 136 and second working fluid 137.

In the preferred embodiment, the working fluid 136 is a lithium bromide/water solution and the working fluid 137 is water. Lithium bromide/water solution retains a low vapor pressure when in solution even at relatively high temperatures. In order to prevent corrosion of the heat transfer means 114 by the working fluids, the pressure within the heat transfer means 114 is maintained near vacuum, and a corrosion inhibitor can be added to the lithium bromide/water solution. An example of a corrosion inhibitor can be implemented by using a "palladium cell" for removing traces of hydrogen gas. To further prevent corrosion within the heat transfer means 114, the interior surfaces of the first heat pipe 116, second heat pipe 118, including the first mesh 132 and second mesh 134, can be treated with triiron tetroxide or other corrosion protectorant.

Figure 3:
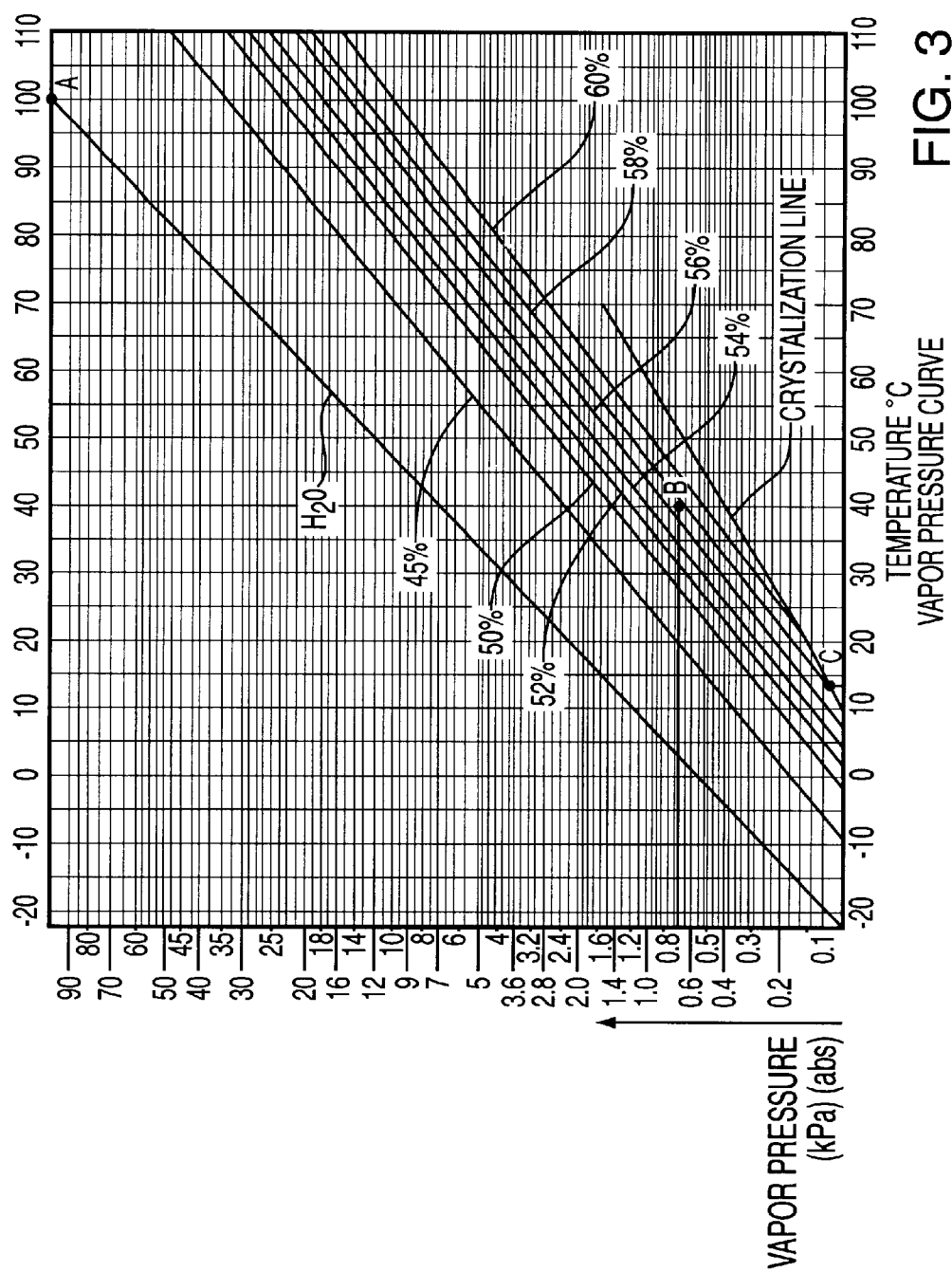
FIG. 3 is a chart illustrating the vapor pressure curves for various concentrations of the working fluid of lithium bromide.

In a preferred embodiment, the lithium bromide/water solution is suitably provided at approximately 58% concentrate solution. The reader should note that hydrogen can be a bi-product of the corrosion process within the heat transfer means 114, and, the generation of hydrogen will increase the pressure within the heat transfer means 114, thereby decreasing the heat pipe's thermal efficiency. In practice, the chosen concentration should not exceed a point in which the crystallization temperature will be experienced during normal operational temperatures, as illustrated in FIG. 3 for lithium bromide solution. Curves illustrating crystallization points relative to temperature and solution concentration for various types of working fluids are readily available in the art. Thus, although the present invention employs lithium bromide/water solution as the working fluid, other suitable working fluids or different concentrations of lithium bromide solution can be adapted to the present invention.

During operation, the first working fluid 136 undergoes various phase and concentration changes within the heat transfer means 114. For example, initially a dilute solution of the first working fluid 136 is found in the first section 122 of the first heat pipe 116 that is positioned in the generator 108. As heat is supplied to the generator via inlet 150, the refrigerant evaporates into a first vapor 138. The first vapor 138 rises within the first heat pipe and eventually moves across from the generator 108 to the condenser 110, where the first vapor 138 is chilled by the second heat transfer fluid 164. The chilled first vapor 138 condenses onto the mesh layer 133 surrounding the absorber section 144, and subsequently returns to the first working fluid 136 in the first section 122 of the first heat pipe 116, partially via capillary action through the first mesh 132. As the refrigerant saturates the absorber section 144, a cooling effect is applied to the reduced diameter section 130 of the second heat pipe.

During operation, the second working fluid 137 also undergoes various phase changes within the heat transfer means 114. For example, the second working fluid 137 absorbs heat from the third heat transfer fluid 172 and forms a second vapor 148. The second vapor 148 rises within the second heat pipe and eventually moves across from the evaporator to the condenser 110, where the second vapor loses heat energy in the reduced diameter section 130. The second vapor condenses and returns to the second working fluid 137 via capillary action through the second mesh 134.

Around the absorber section 144, the refrigerant separated from the dilute lithium bromide solution in the generator, saturates the mesh layers 133, thereby making the mesh layers 133 super-wetted. Although a portion of the refrigerant is returned to the first section 122 of the first heat pipe via capillary force, a portion of the refrigerant on the mesh layers 133 also again re-vaporizes upon absorbing heat from the second vapor 148 through the walls of the heat pipes at the interlocking juncture, i.e., from the absorber. The re-vaporized first vapor is again cooled and condenses onto the mesh 133, where a portion is returned to the first section of the first pipe, while a portion is again re-vaporized upon making contact with the absorber. This phase changing process cycles repeatedly during operation of the absorption chiller. In sum, the condenser 110 serves two functions, i.e., providing cooling to condense both the working fluids of the first heat pipe and the second heat pipe.

Figure 2:
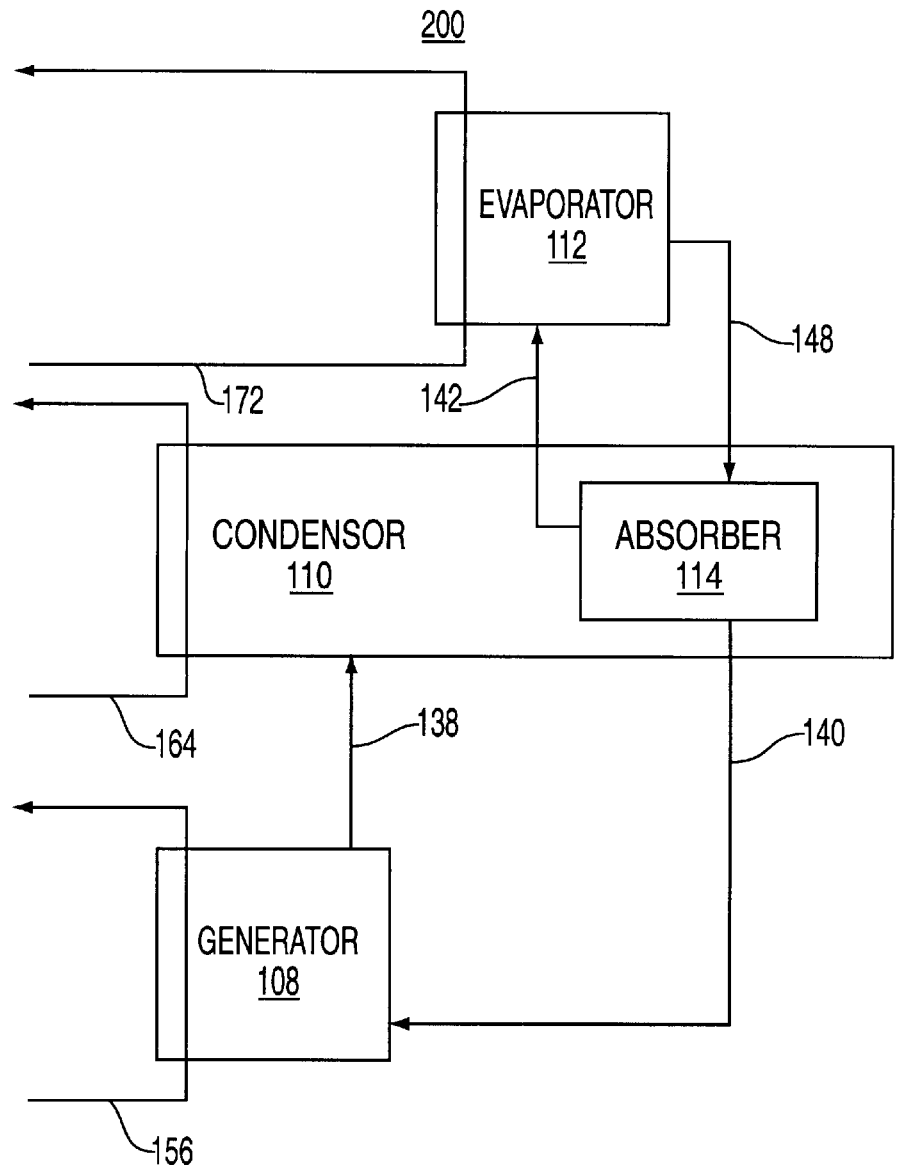
FIG. 2 is a flow diagram of the heat exchanger of FIG. 1.

To further clarify the fluid dynamics within the present absorption chiller, the operation of the heat transfer means 114 is best understood by viewing the operation cycle or method 200 depicted in FIG. 2 while continuing to reference the schematic of FIG. 1. The method 200 begins with the heating of the dilute solution of the first working fluid 136 within the generator 108 by the first heat transfer fluid 156. The first vapor 138 moves into the condenser 110. The first vapor 138 is cooled in the condenser 110 by the second heat transfer fluid 164, and condenses on the mesh layers 133.

The second working fluid 137 in the evaporator 112 is subjected to a combination of a lower pressure on the reduced diameter section (induced from the cooling of the mesh layers 133) and heating by the third heat transfer fluid 172 on the opposing end of the second heat pipe. The low heat pipe pressure and addition of heat causes the second working fluid 137 in the evaporator 112 to change into the second vapor 148. The phase change from the second working fluid 137 to the second vapor 148 causes a large amount of energy (known in the art as the latent heat of evaporation) to be extracted from the third heat transfer fluid 172. The second vapor 148 rises into the reduced diameter section 130 where it is cooled by the absorber section 144 (i.e., heat is removed from the second vapor 148, and passes to the condensed refrigerant in the mesh layers 133). The cooled second vapor 148 turns into a liquid state and returns via mesh 134 to the other end of the second heat pipe. Again, this phase changing process cycles repeatedly during operation of the absorption chiller.

The reader should note that the preferred embodiment discussed above is not limited to the configuration of the absorption chiller 100 as described above. First, depending on the desired amount of heat recovery, multiple pairs of interlocking heat pipes 116 and 118 can be employed within the same housing 102. Second, although the shape of the heat transfer means 114 is described generally in a cylindrical configuration, it should be understood that the heat transfer means 114 and its dimensions can be adapted to any shape or size that will promote the fluid dynamics and heat exchanging properties as described above when disposed within a three chamber absorption chiller. Third, although the working fluids of lithium bromide solution and water are employed in the first and second heat pipes respectively in a preferred embodiment, it should be understood that any other working fluids or refrigerants can be employed, e.g., freon, R22, ammonia and the likes. Finally, although the present invention is described in view of an absorption chiller, the present invention can be adapted to any heat exchanger that can exploit the unique heat exchanging properties as described above.

Although the embodiment disclosed above which incorporate the teachings of the present invention has been shown and described in detail herein, those skilled in the art can readily devise other varied embodiments which still incorporate the teachings and do not depart from the spirit of the invention.

What is claimed is:

1. A heat exchanging apparatus comprising:
   a generator for receiving a first heat transfer source;
   a condenser, coupled to said generator, for receiving a second heat transfer source;
   an evaporator, coupled to said condenser, for receiving a third heat transfer source; and
   a heat transfer device, coupled to said generator, condenser, and evaporator, for causing said third heat transfer source to be cooled.

2. The heat exchanging apparatus of claim 1, wherein said heat transfer device comprises a first heat pipe and a second heat pipe.

3. The heat exchanging apparatus of claim 2, wherein said first and second heat pipes are interlocked.

4. The heat exchanging apparatus of claim 3, wherein said first heat pipe has a bend defining a lower first section and an upper second section and said second heat pipe has a first section and a reduced diameter section.

5. The heat exchanging apparatus of claim 4, wherein said upper second section of said first heat pipe is coupled with said reduced diameter section of said second heat pipe.

6. The heat exchanging apparatus of claim 5, wherein said reduced diameter section of said second heat pipe forms a portion of an absorber.

7. The heat exchanging apparatus of claim 2, wherein said first heat pipe carries a working fluid of lithium bromide solution and said second heat pipe carries a working fluid of water.

8. The heat exchanging apparatus of claim 1, wherein said heat exchanging apparatus is an absorption chiller.

9. The heat exchanging apparatus of claim 4, wherein said upper second section of said first heat pipe is disposed within said condenser.

10. The heat exchanging apparatus of claim 4, wherein said lower first section of said first heat pipe is disposed within said generator.

11. The heat exchanging apparatus of claim 4, wherein said reduced diameter section of said second heat pipe is disposed within said condenser.

12. The heat exchanging apparatus of claim 4, wherein said first section of said second heat pipe is disposed within said evaporator.

13. The heat exchanging apparatus of claim 4, wherein said upper second section of said first heat pipe carries a plurality of mesh layers.

14. A heat exchanging apparatus comprising:
   a generating means for receiving a first heat transfer source;
   a condensing means, coupled to said generating means, for receiving a second heat transfer source;
   an evaporating means, coupled to said condensing means, for receiving a third heat transfer source; and
   a heat transfer means, coupled to said generating, condensing, and evaporating means, for causing said third heat transfer source to be cooled.

15. The heat exchanging apparatus of claim 14, wherein said heat transfer means comprises a first heat pipe and a second heat pipe.

16. The heat exchanging apparatus of claim 15, wherein said first and second heat pipes are interlocked.

17. A method for providing a cooled fluid for a cooling system, said method comprising the steps of:
   (a) receiving a first heat transfer source into a generator;
   (b) receiving a second heat transfer source into a condenser;
   (c) receiving a third heat transfer source into an evaporator; and
   (d) applying a heat transfer device within said generator, condenser, and evaporator, for causing said third heat transfer source to be cooled to produce the cooled fluid for the cooling system.

18. The method of claim 17, wherein said applying step (d) applies said heat transfer device having a first heat pipe and a second heat pipe.

19. The method of claim 18, wherein said applying step (d) applies said heat transfer device having a first heat pipe and a second heat in an interlocked configuration.

20. The method of claim 19, wherein said applying step (d) applies said heat transfer device having a first heat pipe and a second heat pipe in an interlocked configuration, where said first heat pipe has a bend defining a lower first section and an upper second section and said second heat pipe has a first section and a reduced diameter section.

* * * * *